United States Patent
Hong et al.

(10) Patent No.: US 7,138,351 B2
(45) Date of Patent: Nov. 21, 2006

(54) PHOSPHATE-BASED CERAMIC COMPOSITIONS WITH LOW DIELECTRIC CONSTANT AND METHOD FOR MANUFACTURING DIELECTRIC SUBSTRATE USING THE SAME

(75) Inventors: Kug Sun Hong, Seoul (KR); Dong Wan Kim, Seoul (KR); Hyun Seung Yu, Seoul (KR); Hee Bum Hong, Seoul (KR); Jeong Ryeol Kim, Seongnam-si (KR); In Sun Cho, Gimcheon-si (KR)

(73) Assignee: Seoul National University Industry Foundation, Seoul (KR)

( * ) Notice: Subject to any disclaimer, the term of this patent is extended or adjusted under 35 U.S.C. 154(b) by 0 days.

(21) Appl. No.: 10/722,491

(22) Filed: Nov. 28, 2003

(65) Prior Publication Data

US 2005/0056360 A1     Mar. 17, 2005

(30) Foreign Application Priority Data

Sep. 17, 2003    (KR) .................. 10-2003-0064557

(51) Int. Cl.
*C04B 35/447*    (2006.01)

(52) U.S. Cl. ........................ 501/123; 501/1

(58) Field of Classification Search ............ 501/1, 501/45, 47, 123; 423/305, 306, 308
See application file for complete search history.

(56) References Cited

U.S. PATENT DOCUMENTS

| | | | | |
|---|---|---|---|---|
| 4,084,979 A | * | 4/1978 | Sano et al. | 501/111 |
| 5,034,352 A | * | 7/1991 | Vit et al. | 501/1 |
| 6,090,732 A | * | 7/2000 | Ito et al. | 501/1 |
| 6,376,398 B1 | * | 4/2002 | Lee et al. | 501/32 |
| 6,514,891 B1 | * | 2/2003 | Lee | 501/32 |
| 6,749,769 B1 | * | 6/2004 | Gai | 252/62.9 R |

* cited by examiner

*Primary Examiner*—Karl Group
(74) *Attorney, Agent, or Firm*—Rosenberg, Klein & Lee

(57) ABSTRACT

Disclosed herein is a phosphate-based dielectric ceramic composition which has a low dielectric constant and a low dielectric loss in the high-frequency bands such as microwave and millimeter wave. The composition is represented by the following formula: $(1-x)(A'_{1-y}A''_y)O-xP_2O_5$ wherein x and y are numbers satisfying the following conditions: $0 < x < 1$ and $0 \leq y \leq 1$, and A' and A" are each independently selected from the group consisting of Ca, Ba, Sr, Zn, Mb, Ni, Mn and Cu. The composition may further include a sintering assistant and an additive. Since the composition can be sintered at a temperature as low as 1,000° C., it can be simultaneously calcined together with a metal electrode such as silver, copper or silver/palladium electrode.

2 Claims, No Drawings

PHOSPHATE-BASED CERAMIC COMPOSITIONS WITH LOW DIELECTRIC CONSTANT AND METHOD FOR MANUFACTURING DIELECTRIC SUBSTRATE USING THE SAME

BACKGROUND OF THE INVENTION

1. Field of the Invention

The present invention relates to a phosphate-based dielectric ceramic composition which has dielectric characteristics suitable to use as a substrate material for electronic components having internal conductors such as resonators, multilayer ceramic capacitors, dielectric filters, antennas, dielectric waveguides for microwave integrating circuit (MIC) in the microwave region, and a method for manufacturing a dielectric substrate using the ceramic composition. Since the dielectric ceramic composition has excellent dielectric characteristics, e.g., a low dielectric loss, a low dielectric constant and excellent temperature stability, and can be sintered at low temperature in combination with an additive, it can be simultaneously calcined together with a metal electrode such as silver, copper or silver/palladium electrode.

2. Description of the Related Art

With high-speed information transmission and recent development of mobile communication techniques, demand for light, compact and high-integrated circuits has been increasing. In addition, as the number of signals transmitted increases, studies on the use of high frequencies ranging from a few GHz and higher are being actively undertaken. There is thus a strong demand for dielectric compositions used as materials for electronic components and substrates in the high-frequency bands.

Generally, as the dielectric constant of a dielectric is low, the transmission speed of signals inside the dielectric is high. Accordingly, it is preferred that electronic components used in the high-frequency bands have a low dielectric constant. In order to improve the selectiveness of the signal transmission, dielectrics having a low dielectric loss, i.e. high Q-factor, and excellent temperature stability are required.

As electrically conductive materials used as internal conductors and electrodes of packaging substrates, inexpensive metals such as Ag and Cu are advantageously used because they have a low specific resistance, resulting in less loss and heat. However, since these metal electrodes have a melting point of lower than 1,000° C., dielectric compositions used in combination with substrates must be calcined at a temperature of not lower than 1,000° C. for simultaneous calcination.

A representative example of ceramic compositions which can be calcined at low temperature among conventional substrate materials is glass ceramics. Since the glass ceramics is manufactured by incorporating a large amount of a glass component into a ceramic such as alumina, it can be calcined even at low temperature by glass softening. In addition, various combinations of glass with a ceramic can improve the physical properties of glass ceramics.

Japanese Patent Laid-Open No. 10-297960 discloses a ceramic composition having a low dielectric constant and a low dielectric loss which comprises $Zn_2SiO_4$ and $SiO_2$ as a ceramic and $SiO_2$—$Li_2O$—$ZnO$ glass. According to the ceramic composition, calcination at 800~1,000° C. is possible.

Although the glass ceramics is advantageous in terms of its low dielectric constant resulting from the presence of a large amount of glass, it has disadvantages of a considerably reduced Q-factor and a high dielectric loss in the high-frequency bands. Additionally, the glass ceramics has poor temperature stability because the resonance frequency temperature coefficient cannot be stably controlled.

SUMMARY OF THE INVENTION

Therefore, the present invention has been made in view of the above problems, and it is an object of the present invention to provide a dielectric ceramic composition which has a low dielectric constant, low-temperature sinterability and excellent temperature stability and is easy to control the dielectric characteristics.

A low dielectric constant of the dielectric ceramic composition can be achieved by mixing diphosphorus pentaoxide ($P_2O_5$) and an oxide of a divalent metal (Ba, Sr, Ca, Zn, Ni, Mg, Cu or Mn) at various ratios. The dielectric characteristics of the dielectric ceramic composition can be easily controlled by the formation of a solid solution of the divalent metal. Low-temperature sinterability of the dielectric ceramic composition can be achieved by the use of a small amount of a sintering assistant and an additive instead of glass, together with an Ag electrode. The dielectric ceramic composition exhibits excellent temperature stability without a deterioration in the Q-factor, compared to alumina-based dielectrics.

It is another object of the present invention to provide a dielectric ceramic composition which can exhibit dielectric characteristics in the high-frequency bands and can be calcined at low temperature, unlike conventional phosphate-based ceramic compositions having limited applications such as biomaterials and fluorescent materials.

It is yet another object of the present invention to provide a dielectric ceramic composition which can be widely used as a material for multilayer ceramic capacitors, dielectric waveguides and the like by simultaneous calcination together with a metal electrode such as silver, copper or silver/palladium electrode.

In order to accomplish the above objects of the present invention, there is provided a dielectric composition represented by the following formula:

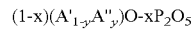

$(1-x)(A'_{1-y}A''_{y})O\text{-}xP_2O_5$ wherein x and y are numbers satisfying the following conditions: $0<x<1$ and $0 \leq y \leq 1$, and A' and A'' are each independently Ca, Ba, Sr, Zn, Mb, Ni, Mn or Cu.

In accordance with one aspect of the present invention, there is provided a method for manufacturing a dielectric ceramic, comprising the steps of: mixing diammonium phosphate ($(NH_4)_2HPO_4$) and an oxide of a divalent metal at an appropriate molar ratio, calcining the mixture, adding an additive to the calcined mixture, milling the mixture, adding a binder to the powder, molding the mixture, and sintering the molded body.

The dielectric ceramic composition for microwave of the present invention is comprised of a first ceramic composition of $(1-x)(A'_{1-y}A''_{y})O\text{-}xP_2O_5$ wherein y is 0, a second ceramic composition of $(1-x)(A'_{1-y}A''_{y})O\text{-}xP_2O_5$ wherein A'' is an oxide of a divalent metal selected from the group consisting of Ca, Ba, Sr, Zn, Mb, Ni, Mn and Cu, or a third ceramic composition prepared by mixing the first or second ceramic composition into at least one oxide selected from $B_2O_3$, $Bi_2O_3$ and CuO as a sintering assistant.

On the other hand, $B_2O_3$ as a sintering assistant may be replaced with a compound serving the same function as $B_2O_3$. Specific examples of the compound capable of replacing $B_2O_3$ include boron-containing glass such as borosilicate, e.g., $Li_2O$—$B_2O_3$, $SiO$—$B_2O_3$, $ZnO$—$B_2O_3$, etc, and borates. In this case, sintering is also possible at a temperature as low as 900° C.

In the case of $(1-x)(A'_{1-y}A''_y)O-xP_2O_5$ wherein x is ⅓ and y is 0, various divalent metal selected from Ba, Ca, Mg, Sr, Zn, Ni, Mn and Cu may be used as A'. There have been a number of studies on the composition (wherein A' is a solid solution of the divalent metal) used as fluorescent materials, but no report has been made on the dielectric characteristics of the composition in the microwave band [A. G. Nord and P. Kierkegaard, Acta. Chem. Scand. 22, 1466(1968) and J. F. Sarver, M. V. Hoffman, and F. A. Hummel, J. Electrochem. Soc. 108, 1103(1961), etc.].

In the following examples, the dielectric characteristics of $(1-x)(A'_{1-y}A''_y)O-xP_2O_5$ wherein x is ¼ and y is 0, and $(1-x)(A'_{1-y}A''_y)O-xP_2O_5$ wherein x is ⅓ and y is 0, were identified using various metals (A").

Both the composition wherein x is ¼ and the composition wherein x is ⅓ exhibited excellent dielectric characteristics in the microwave band. However, since other compositions except the composition wherein x is ¼ and A' is Zn and the composition wherein x is ⅓ and A'is Cu, Zn or Mn have a sintering temperature as high as 1,100° C., they cannot be simultaneously calcined together with a low melting point metal electrode such as silver, copper and silver/palladium electrode.

In order to solve this problem, in the composition $(1-x)(A'_{1-y}A''_y)O-xP_2O_5$ wherein x is ⅓, y is 0 and A' is Cu, Mn or Zn, the divalent metal is substituted using a cation-substituent. The use of the cation-substituent allows sintering at a low temperature of 850° C. and improves the dielectric characteristics.

The rate of the cation-substituent is preferably in the range of 0.01~50 mole %. When Cu is substituted out of this range by a cation-substituent, changes in the resonance frequency are increased according to the temperature of the ceramic composition. When Mn is substituted by a cation-substituent, reduction in the Q-factor is caused. When Zn is substituted out of this range by a cation-substituent, the Q-factor is reduced and changes in the resonance frequency are decreased according to the temperature of the ceramic composition. The substitution with these metals enables sintering at low temperature without the addition of a sintering assistant.

In the following examples, the sintering characteristics and the dielectric characteristics of $(1-x)(A'_{1-y}A''_y)O-xP_2O_5$ wherein x is ¼, y is 1 and A" is a divalent metal selected from Ba, Ca, Mg, Sr, Zn, Ni, Mn and Cu, were identified.

The composition has a sintering temperature as high as 1,000~1,200° C., and exhibits a high sintering density and a high Q-factor. However, in the case that A" is Ba or Ca, the dielectric characteristics may be poor. Accordingly, the selection of an appropriate divalent metal can achieve improved dielectric characteristics.

Since $(1-x)(A'_{1-y}A''_y)O-xP_2O_5$ wherein x is ¼ and y is 1, and $(1-x)(A'_{1-y}A''_y)O-xP_2O_5$ wherein x is ⅓ and y is 1, are calcined at a temperature as high as 1,100° C., they cannot be simultaneously calcined together with a low melting point metal electrode such as silver, copper or silver/palladium electrode. Accordingly, at least one sintering assistant selected from $Bi_2O_3$, $B_2O_3$ and CuO is added in an amount of 0.01~5 parts by weight for low temperature sintering.

The addition of a sintering assistant such as $Bi_2O_3$, $B_2O_3$ or CuO to $(1-x)(A'_{1-y}A''_y)O-xP_2O_5$ wherein x is ¼ and y is 1, improves the sinterability and resonance frequency temperature coefficient (±10 ppm/° C. or less) of the dielectric composition of the present invention. Accordingly, the dielectric composition of the present invention can be used as a material for electronic components requiring temperature stability, for example, temperature-stable multilayer capacitors (NPO MLCC).

In addition, since the dielectric composition of the present invention has a high Q-factor (Qxf) of 30,000 or more at a frequency of 10~19 GHz, it can be used as a substrate material for communication components such as microwave filters, oscillators, planar antennas, MCMs(Multi Chip Modules), etc.

Furthermore, the dielectric composition of the present invention has no or few changes in the dielectric characteristics within the sintering temperature range of 900~950° C., and a broad resonance frequency temperature coefficient ($\tau_f$) range of ±10 ppm/° C. or less.

Hereinafter, a method for manufacturing a dielectric ceramic according to the present invention will be explained in terms of the respective steps.

The dielectric ceramic of the present invention is manufactured from a composition consisting of $(1-x)(A'_{1-y}A''_y)O-xP_2O_5$ wherein x is a number satisfying the following condition: 0<x<1, and y is 0, or $(1-x)(A'_{1-y}A''_y)O-xP_2O5$ wherein x is a number satisfying the following condition: 0<x<1, and A" is a cation-substituent.

The composition is calcined in air at a temperature of 900~1200° C. for 2 hours to form a single phase.

The sintering of the composition is commonly carried out in air at 900~1,200° C., but other cases except the composition wherein x is ⅓ and A" is Cu or Zn exhibit poor low temperature sintering characteristics. In order to impart low temperature sintering characteristics to the composition, the dielectric composition of the present invention is prepared in accordance with the following procedure.

At least one sintering assistant selected from CuO, $Bi_2O_3$ and $B_2O_3$ is added to the composition, followed by drying to remove moisture, calcining, milling, addition of a binder, molding and sintering to prepare a dielectric composition for low-temperature sintering.

The method for preparing the above dielectric ceramic composition can be utilized in the manufacture of actual multilayer components.

In the case that A" is substituted by a cation-substituent, a procedure for manufacturing actual multilayer components by selectively adding a sintering assistant or an additive is as follows:

First, after starting materials described above are weighed and mixed, polyvinyl butiral and a plasticizer are added thereto. The resulting mixture is added to an organic solvent and mixed for 24 hours to produce a slurry for tape casting.

The slurry is deaired and then molded into 10~150 μm thick dielectric tapes using a tape caster. Thereafter, internal electrodes are printed on the dielectric tapes using a paste for electrode with a low melting point of not higher than 1,000° C.

The dielectric tapes on which the internal electrodes are printed are laminated under pressure while heating at 40~70° C., cut into a predetermined size, subjected to binder burning-out, and sintered at a temperature of less than 1,000° C.

According to the method for manufacturing the dielectric multilayer tape as explained above, multilayer components can be manufactured by producing a paste using a dielectric powder instead of the dielectric tape, and printing the paste several times.

Since the dielectric composition prepared in accordance with the method of the present invention can be sintered at about 900° C., it can be simultaneously sintered together with electrodes having a low melting point such as silver. In addition, since the dielectric composition has a resonance frequency temperature coefficient ($\tau_f$) of ±10 ppm/° C. or less, it can be used as a material for electronic components requiring temperature stability, for example, temperature-stable multilayer capacitors (NPO MLCC). Furthermore, since the dielectric composition has a high Q-factor (Qxf) of 30,000 or more at a frequency of 10~19 GHz, it can be used as a substrate material for communication components such as microwave filters, oscillators, planar antennas, MCMs, etc.

Moreover, since the dielectric composition of the present invention has no or few changes in the dielectric characteristics within the sintering temperature range of 900~950° C. and a broad resonance frequency temperature coefficient ($\tau_f$) range of ±10 ppm/° C. or less, it can be stably manufactured into its applied products.

DESCRIPTION OF THE PREFERRED EMBODIMENTS

Hereinafter, the present invention will be described in more detail with reference to the following examples. However, these examples are given for the purpose of illustration and are not to be construed as limiting the scope of the invention.

1. EXAMPLES 1 to 5

In these examples, dielectric compositions for high-frequency were prepared from $(1-x)AO-xP_2O_5$ wherein A is Ca and x (the coefficient of diphosphorus pentaoxide) is 0~1, to identify the sintering characteristics and dielectric characteristics. The preparation procedure of the compositions, and analytical results of the sintering characteristics and dielectric characteristics are explained below.

First, 99.9% $CaCO_3$ and $(NH_4)_2HPO_4$ powders as starting materials were weighed depending on various x values. After the powders were mixed with ethanol in a weight ratio of 1:1 and charged into a polyethylene bottle, 1 part by weight of a dispersing agent (Cerasperse 5468CF, Sannopco, Japan) was added thereto. The resulting mixture was charged into a ball mill with yttria stabilized zirconia balls, and mixed for 24 hours to obtain a slurry.

The slurry was heated in an oven at 100° C. to remove the solvent, transferred to an alumina crucible, and calcined at 1,000~1,300° C. for 2 hours. The calcined powder was milled for 24 hours in accordance with the same manner described above.

After milling, the powder was dried in an oven at 100° C., and then 10 parts by weight of polyvinyl alcohol (PVA) as a binder was added thereto. Thereafter, the resulting mixture was granulated, molded into a cylindrical shape (diameter: 10 mm, height: 4~6 mm) under a pressure of 1,000 kg/cm², and then sintered in air at 1,100~1,300° C. At this time, the temperature was elevated at a rate of 5° C. per minute, and slowly cooled.

The dielectric characteristics of the sintered specimens thus manufactured were examined. The dielectric characteristics were measured in high-frequency bands in the GHz range using a network analyzer (HP8720C, Hewlett Packard) in accordance with the transmission cavity method and post resonator method.

The sintering characteristics and dielectric characteristics were measured after sintering the dielectric compositions prepared from $(1-x)CaO-xP_2O_5$ (0<x<1) in air at 900~1,200° C. for 2 hours. The results are shown in Table 1 below.

TABLE 1

| Example Nos. | x | Sintering temp. (° C.) | Shrinkage (%) | Q-factor (Qxf) | Dielectric constant ($\epsilon_r$) | Resonance frequency temperature coefficient ($\tau_f$) ($\times 10^{-6}$/° C.) |
|---|---|---|---|---|---|---|
| Example 1 | 1/5 | 1500 | 8.3 | 7000 | 7.2 | −77.0 |
| Example 2 | 1/4 | 1100 | 16.9 | 13900 | 9.8 | −45.9 |
| Example 3 | 1/3 | 1150 | 18.1 | 44900 | 7.5 | −53 |
| Example 4 | 3/7 | 950 | 14.7 | 46500 | 7.0 | −16.0 |
| Example 5 | 1/2 | 950 | 14.4 | 50200 | 5.2 | −52.0 |

As can be seen from Table 1, in the case that x is 1/5, the sintering temperature decreased from 1,500° C. to 950° C. with increasing mole fraction of $P_2O_5$. In addition, as the mole fraction (x) of $P_2O_5$ increased, the Q-factor increased, the dielectric constant decreased and all resonance frequency temperature coefficients were negative values. However, as the molar fraction of $P_2O_5$ increased, the density becomes poor. When the sintering temperature was increased, a liquid phase was formed and thus it was impossible to obtain specimens having a high density and a high strength.

Accordingly, excellent sintering characteristics and dielectric characteristics were exhibited in the composition wherein x is in the range of 1/4~1/3.

2. EXAMPLES 6 to 28

In these examples, dielectric compositions for high-frequency were prepared from $(1-x)A'_{1-y}A''_yO-xP_2O_5$ wherein A' and A" are each independently Ba, Sr, Ca, Zn, Mg, Ni, Cu or Mn, x is 1/4~1/3 and y is 0 or is not 0, to identify the sintering characteristics and dielectric characteristics. The preparation procedure of the compositions, and analytical results of the sintering characteristics and dielectric characteristics are explained below.

First, $(1-x)A'_{1-y}A''_yO-xP_2O_5$ wherein A' and A" are each independently Ba, Sr, Ca, Zn, Mg, Ni, Cu or Mn, x is 1/4~1/3, $BaCO_3$, $SrCO_3$, $CaCO_3$, $ZnO$, $MgO$, $NiO$, $CuO$ or $MnO$ (corresponding to A'O in the composition, each having a purity of 99.9%) and $(NH_4)_2HPO_4$ as starting materials were weighed so as to have a molar ratio of 3:2 and 2:2. Specimens were manufactured in the same manner as in Examples 1 to 5, and their sintering characteristics and dielectric characteristics were measured.

The sintering characteristics and dielectric characteristics of $(1-x)(A'_{1-y}A''_y)O-xP_2O_5$ (0<x<1, 0≦y≦1) are shown in Tables 2 and 3 below.

TABLE 2

| Example Nos. | X | y | | | | | | |
|---|---|---|---|---|---|---|---|---|
| | | Ca | Ba | Sr | Zn | Mg | Mn | Cu |
| Example 3 | 1/3 | 1 | | | | | | |
| Example 6 | | | 1 | | | | | |
| Example 7 | | | | 1 | | | | |
| Example 8 | | | | | 1 | | | |
| Example 9 | | | | | | 1 | | |
| Example 10 | | | | | | | 1 | |
| Example 11 | | | | | | | | 1 |
| Example 12 | | 1/2 | | 1/2 | | | | |
| Example 13 | | 1/2 | | | | | | 1/2 |
| Example 14 | | | | 1/2 | 1/2 | | | |
| Example 15 | | | | | 1/2 | | | 1/2 |

TABLE 2-continued

| Example Nos. | X | Ca | Ba | Sr | Zn | Mg | Mn | Cu |
|---|---|---|---|---|---|---|---|---|
| Example 16 | | | | | 1/2 | | 1/2 | |
| Example 17 | | | | | 1/2 | | | 1/2 |
| Example 2 | 1/4 | 1 | | | | | | |
| Example 18 | | | 1 | | | | | |
| Example 19 | | | | 1 | | | | |
| Example 20 | | | | | 1 | | | |
| Example 21 | | | | | | | 1 | |
| Example 22 | | 2/3 | 1/3 | | | | | |
| Example 23 | | 1/3 | 2/3 | | | | | |
| Example 24 | | 1/3 | | | | | 2/3 | |
| Example 25 | | | 2/3 | 1/3 | | | | |
| Example 26 | | | 1/3 | 2/3 | | | | |
| Example 27 | | | | | | 1/3 | 2/3 | |
| Example 28 | | | | | | | 2/3 | 1/3 |

TABLE 3

| Example Nos. | Sintering temp. (° C.) | Sintering density (g/cm³) | Q-factor (Qxf) | Dielectric constant ($\epsilon_r$) | Resonance frequency temperature coefficient ($\tau_f$) (×10⁻⁶/° C.) |
|---|---|---|---|---|---|
| Example 3 | 1150 | 2.95 | 44900 | 7.5 | −53 |
| Example 6 | 1150 | 3.39 | 5100 | 6.3 | notlinear |
| Example 7 | 1150 | 3.47 | 41800 | 7.4 | −23 |
| Example 8 | 875 | 3.22 | 28300 | 6.2 | −204 |
| Example 9 | 1150 | 2.98 | 52000 | 5.8 | −746 |
| Example 10 | 1050 | 3.32 | 20800 | 7.1 | −88 |
| Example 11 | 950 | 3.69 | 46700 | 6.7 | −359 |
| Example 12 | 850 | 3.30 | 42300 | 7.1 | −98 |
| Example 13 | 875 | 3.38 | 55100 | 7.1 | −80 |
| Example 14 | 900 | 3.74 | 52300 | 7.2 | −81 |
| Example 15 | 875 | 3.80 | 43100 | 6.9 | −71 |
| Example 16 | 925 | 3.49 | 12200 | 7.0 | not linear |
| Example 17 | 925 | 3.90 | 8300 | 8.9 | −170 |
| Example 2 | 1100 | 3.00 | 13900 | 9.8 | −46 |
| Example 18 | 1170 | 5.03 | 38100 | 11.4 | notlinear |
| Example 19 | 1150 | 4.44 | 22300 | 12.6 | 44 |
| Example 20 | 875 | 3.44 | 52000 | 5.3 | −101 |
| Example 21 | 1150 | 2.61 | 49400 | 5.1 | −27 |
| Example 22 | 1100 | 3.51 | 8250 | 8.9 | −121 |
| Example 23 | 1200 | 4.08 | 5680 | 8.8 | −79 |
| Example 24 | 1100 | 3.33 | 21600 | 7.2 | −65 |
| Example 25 | 1170 | 4.90 | 33150 | 13.0 | 79 |
| Example 26 | 1170 | 4.64 | 34300 | 13.2 | 80 |
| Example 27 | 1100 | 3.17 | 33600 | 5.7 | −89 |
| Example 28 | 1100 | 3.05 | 36570 | 6.0 | −41 |

The sintering characteristics and dielectric characteristics of $(1-x)(A'_{1-y}A''_y)O\text{-}xP_2O_5$ (A' and A" are each independently Ba, Sr, Ca, Zn, Mg, Ni, Cu or Mn, and x is ⅓) at different A' and A" (Examples 6 to 17) are shown in Tables 2 and 3. The dielectric constant of Examples 6 to 17 was as low as 5~9, and the Q-factor was very high.

In addition, all resonance frequency temperature coefficients were negative values. Particularly, in the case that A' is Zn, the sintering temperature was very low (875° C.), indicating that the substitution of A" with Zn or Cu can decrease the sintering temperature to 925° C. without a reduction in the Q-factor.

The sintering characteristics and dielectric characteristics of $(1-x)(A'_{1-y}A''_y)O\text{-}xP_2O_5$ (A' and A" are each independently Ba, Sr, Ca, Zn, Mg, Ni, Cu or Mn, and x is ¼) at different A' and A" (Examples 18 to 28) are shown in Tables 2 and 3. As can be seen from Tables 2 and 3, as the mole fraction of A'O or A"O increased, the dielectric constant increased and the Q-factor was as high as when x is ⅓. In addition, the resonance frequency temperature coefficients were negative values except that A' is Sr (+44). Although the case wherein A' is Ba exhibited non-linear temperature coefficient characteristics, it can be controlled so as to have a positive temperature coefficient by substituting Ba with Sr.

3. EXAMPLES 29 to 48

In these examples, a sintering assistant in the form of an oxide was added to the composition of $(1-x)(A'_{1-y}A''_y)O\text{-}xP_2O_5$, to identify the sintering characteristics and dielectric characteristics. First, $(1-x)(A'_{1-y}A''_y)O\text{-}xP_2O_5$ powder was calcined in the same manner as in the previous examples. 1~5 parts by weight of at least one sintering assistant selected from CuO, $B_2O_3$ and $Bi_2O_3$ was added to the powder, and then milled for 24 hours in the same manner as in the previous examples to manufacture specimens.

The dielectric compositions prepared by mixing the sintering assistant and the composition $(1-x)(A'_{1-y}A''_y)O\text{-}xP_2O_5$ were sintered in air at 850~1100° C. The sintering characteristics and dielectric characteristics of the dielectric compositions were measured. The results are shown in Tables 4 and 5 below.

TABLE 4

| Example Nos. | x | Ca | Ba | Sr | Zn | Mg | Mn | Cu | CuO | $B_2O_3$ | $Bi_2O_3$ |
|---|---|---|---|---|---|---|---|---|---|---|---|
| Example 29 | 1/3 | 1 | | | | | | | 3 | | |
| Example 30 | | 1 | | | | | | | | 3 | |
| Example 31 | | | 1 | | | | | | 3 | | |
| Example 32 | | | | 1 | | | | | 3 | | |
| Example 33 | | | | 1 | | | | | | 3 | |
| Example 34 | | | | | 1 | | | | 3 | | |
| Example 35 | | | | | 1 | | | | | 3 | |
| Example 36 | | | | | | 1 | | | 3 | | |
| Example 37 | | | | | | | 1 | | 3 | | |
| Example 38 | | | | | | | | 1 | 3 | | |

TABLE 4-continued

| Example Nos. | x | y | | | | | | Additive (part by weight) | | |
|---|---|---|---|---|---|---|---|---|---|---|
| | | Ca | Ba | Sr | Zn | Mg | Mn | Cu | CuO | B$_2$O$_3$ | Bi$_2$O$_3$ |
| Example 39 | | | | | | | | 1 | | | 3 |
| Example 40 | 1/4 | 1 | | | | | | | 3 | | |
| Example 41 | | | 1 | | | | | | 3 | | |
| Example 42 | | | 1 | | | | | | | 3 | |
| Example 43 | | | | 1 | | | | | 3 | | |
| Example 44 | | | | | 1 | | | | | | 3 |
| Example 45 | | | 1/3 | 2/3 | | | | | 3 | | |
| Example 46 | | | 1/3 | 2/3 | | | | | | 3 | |
| Example 47 | | | 2/3 | 1/3 | | | | | 3 | | |
| Example 48 | | | 2/3 | 1/3 | | | | | | 3 | |

TABLE 5

| Example Nos. | Sintering temp. (° C.) | Sintering density (g/cm$^3$) | Q-factor (Qxf) | Dielectric constant ($\epsilon_r$) | Resonance frequency temperature coefficient ($\tau_f$) (×10$^{-6}$/° C.) |
|---|---|---|---|---|---|
| Example 29 | 1000 | 2.99 | 31000 | 7.6 | −62 |
| Example 30 | 1050 | 2.91 | 36000 | 7.4 | −70 |
| Example 31 | 1100 | 3.30 | 2700 | 6.4 | not linear |
| Example 32 | 1000 | 3.45 | 35000 | 7.5 | −31 |
| Example 33 | 1050 | 3.42 | 37000 | 7.2 | −32 |
| Example 34 | 850 | 3.19 | 31000 | 6.9 | −220 |
| Example 35 | 850 | 3.25 | 33200 | 6.6 | −240 |
| Example 36 | 1000 | 3.00 | 40000 | 5.9 | −700 |
| Example 37 | 950 | 2.95 | 11200 | 7.2 | −90 |
| Example 38 | 900 | 3.70 | 44000 | 6.5 | −324 |
| Example 39 | 875 | 3.65 | 41000 | 6.3 | −392 |
| Example 40 | 1000 | 3.01 | 8500 | 9.2 | −52 |
| Example 41 | 900 | 5.01 | 38700 | 11.6 | 0 |
| Example 42 | 900 | 4.85 | 56100 | 11.0 | 1 |
| Example 43 | 900 | 4.38 | 14900 | 12.6 | 26 |
| Example 44 | 900 | 2.63 | 31000 | 5.3 | −40 |
| Example 45 | 900 | 4.66 | 28000 | 13.3 | 31 |
| Example 46 | 900 | 4.59 | 31000 | 12.9 | 40 |
| Example 47 | 900 | 4.92 | 27500 | 13.1 | 25 |
| Example 48 | 900 | 4.89 | 30500 | 13.0 | 29 |

As can be seen from the results of Table 4 and 5, the mixture of the sintering assistant selected from CuO, B$_2$O$_3$ and Bi$_2$O$_3$ and the composition (1-x)(A'$_{1-y}$A"$_y$)O-xP$_2$O$_5$ greatly lowered the sintering temperature. Particularly, the sintering assistant could lower the sintering temperature without greatly reducing the Q-factor and dielectric constant. The addition of CuO and B$_2$O$_3$ as sintering assistants to the composition (wherein x is ¼ and A' is Sr) according to Example 19 could lower the sintering temperature to 900° C. and control the resonance frequency temperature coefficient so as to have a negative value, thus compensating 0 ppm/° C.

Accordingly, since the dielectric composition of the present invention prepared by mixing the composition (1-x) (A'$_{1-y}$A"$_y$)O-xP$_2$O$_5$ and the sintering assistant is sintered at a temperature of not higher than 1,000° C., it can be calcined together with a low melting point electrode, e.g., silver, copper or silver/palladium electrode, to manufacture multilayer devices.

In addition, since the dielectric composition of the present invention shows excellent dielectric characteristics, for example, a dielectric constant of about 10 and a Q-factor of 30,000 or higher, it can be satisfactorily used as a material for microwave devices in the GHz bands.

As apparent from the above description, since the dielectric composition of the present invention is sintered at a low temperature of 1,000° C. by the addition of a small amount of an additive, it can be simultaneously calcined together with a low melting point metal electrode such as silver electrode. In addition, the dielectric ceramic composition can be used as a dielectric for multilayer capacitors (MLCC). Furthermore, since the dielectric ceramic composition has a low dielectric loss and a low dielectric temperature coefficient, it can be suitably used to manufacture components for mobile communications such as personal communications services (PCSs).

In particular, since the dielectric composition of the present invention prepared by mixing the composition (1-x) (A'$_{1-y}$A"$_y$)O-xP$_2$O$_5$ and an additive has a low dielectric loss, low-temperature sinterability and no or few changes in the resonance frequency temperature coefficient, it can be used as a material for electronic components requiring temperature stability, for example, temperature-stable multilayer capacitors (NPO MLCC), microwave oscillators, substrates, filters, planar antennas, etc. Moreover, since the dielectric composition of the present invention shows a broad composition range and no or few changes in the dielectric characteristics depending on the sintering temperature, it can be stably manufactured into its applied products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A phosphate-based ceramic composition with a low dielectric constant, comprising:
   (a) a portion represented by the following formula:

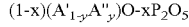
   (1-x)(A'$_{1-y}$A"$_y$)O-xP$_2$O$_5$ wherein A' and A" are each independently Ca, Ba, Sr, Zn, Mg, Ni, Mn or Cu,
   and x and y are numbers satisfying the following conditions: ⅕≦x<⅔ and 0≦y≦1, x being defined in molar ratio, wherein said phosphate-based ceramic composition has a dielectric constant of 13.2 or less; and (b) 0.01~5 parts by weight of at least one sintering assistant selected from the group consisting of CuO, $B_2O_3$ and $Bi_2O_3$ based on 100 parts by weight of the composition.

2. A phosphate-based ceramic composition with a low dielectric constant, comprising:

a portion represented by the following formula:

$$(1-x)(A'_{1-y}A''_{y})O-xP_2O_5$$

wherein A' and A" are each independently Ca, Ba, Sr, Zn, Ni, Mn or Cu, and x and y are numbers satisfying the following conditions: $\frac{1}{5} \leq x < \frac{2}{5}$ and $0 \leq y \leq 1$, x being defined in molar ratio, wherein said phosphate-based ceramic composition has a dielectric constant of 13.2 or less.

* * * * *